(12) United States Patent
Miyashita

(10) Patent No.: US 8,099,948 B2
(45) Date of Patent: Jan. 24, 2012

(54) EXHAUST SYSTEM OF INTERNAL COMBUSTION ENGINE

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 694 days.

(21) Appl. No.: 12/085,899

(22) PCT Filed: Dec. 7, 2006

(86) PCT No.: PCT/IB2006/003508
§ 371 (c)(1),
(2), (4) Date: Jun. 2, 2008

(87) PCT Pub. No.: WO2007/066211
PCT Pub. Date: Jun. 14, 2007

(65) Prior Publication Data
US 2009/0038293 A1 Feb. 12, 2009

(30) Foreign Application Priority Data
Dec. 8, 2005 (JP) .................... 2005-354738

(51) Int. Cl.
*F01N 5/04* (2006.01)
*F01N 3/00* (2006.01)
*F01N 3/10* (2006.01)

(52) U.S. Cl. ............... 60/280; 60/287; 60/299

(58) Field of Classification Search ........ 60/280
See application file for complete search history.

(56) References Cited

U.S. PATENT DOCUMENTS

| | | | |
|---|---|---|---|
| 5,384,098 A | 1/1995 | Morikawa | |
| 6,138,453 A * | 10/2000 | Sawada et al. | 60/277 |
| 6,564,543 B1 * | 5/2003 | Orzel et al. | 60/277 |
| 6,770,116 B2 * | 8/2004 | Kojima | 95/14 |
| 6,868,669 B2 * | 3/2005 | Tanaka | 60/286 |
| 2002/0100273 A1 | 8/2002 | Bubeck et al. | |
| 2004/0112046 A1 * | 6/2004 | Tumati et al. | 60/297 |

FOREIGN PATENT DOCUMENTS

| | | |
|---|---|---|
| EP | 0 716 221 A1 | 6/1996 |
| EP | 716221 A1 * | 6/1996 |
| EP | 1 180 583 A2 | 2/2002 |
| GB | 1 457 570 | 12/1976 |
| JP | B2-27246 | 5/1989 |
| JP | U-1-173423 | 12/1989 |
| JP | A-7-247833 | 9/1995 |
| JP | A-8-121153 | 5/1996 |
| JP | A-10-148119 | 6/1998 |
| JP | A-2001-193445 | 7/2001 |

OTHER PUBLICATIONS

Chinese Office Action issued in Chinese Patent Application No. 200680045875.7 on Dec. 11, 2009 (with translation).

* cited by examiner

*Primary Examiner* — Thomas Denion
*Assistant Examiner* — Jason Shanske
(74) *Attorney, Agent, or Firm* — Oliff & Berridge, PLC

(57) ABSTRACT

A first control valve is disposed downstream of a junction point of a first exhaust passage, and a second catalytic converter is disposed downstream of a junction point of the second exhaust passage. The first control valve and the second control valve are controlled so that the exhaust gas of all of the cylinders mainly passes one of the first catalytic converter disposed in the first exhaust passage and the second catalytic converter disposed in the second exhaust passage during a fuel-supply cutoff period.

8 Claims, 3 Drawing Sheets

EXHAUST SYSTEM OF INTERNAL COMBUSTION ENGINE

BACKGROUND OF THE INVENTION

1. Field of the Invention

The invention relates to an exhaust system of an internal combustion engine.

2. Description of the Related Art

In an exhaust system of an internal combustion engine, such as a V-type engine, having a plurality of cylinders, all of the cylinders are divided into two cylinder groups, each of which is provided with an exhaust manifold, and an exhaust passage is provided for each of the cylinder groups such that the exhaust passage extends from the corresponding exhaust manifold to an exhaust merging point at which streams of exhaust gas from the respective exhaust passages join together. In the exhaust system of this type, it has been proposed that a turbine of a turbocharger and a catalytic converter downstream of the turbine are disposed only in one of the exhaust passages, and this exhaust passage communicates at a junction point upstream of the turbine with a junction point of the other exhaust passage, while a control valve is disposed downstream of the junction point of the other exhaust passage. An example of the thus constructed exhaust system is disclosed in, for example, JP-B2-1-27246.

In the arrangement as described above, the control valve is used as a wastegate valve of the turbocharger, and the control valve is closed during low-load engine operation in which a small amount of exhaust gas is produced, so that the exhaust gas of all of the cylinders passes the turbine. During high-load engine operation in which a large amount of exhaust gas is produced, the control valve is opened so that the exhaust gas of the other cylinder group passes the other exhaust passage, and only the exhaust gas of the above-indicated one cylinder group passes the turbine. In this manner, the boost pressure established by the turbocharger is constantly controlled to a set value or its vicinity.

When the vehicle is decelerating, a fuel-supply cutoff operation is usually performed to reduce fuel consumption. In the exhaust system described above, if the control valve is closed, due to a low engine load, even during the fuel-supply cutoff period so that the exhaust gas of all of the cylinders passes the turbine, the exhaust gas of all the cylinders passes the catalytic converter. If the temperature of the catalytic converter is high, catalysts, formed of noble metal, usually carried on the catalytic converter, deteriorate due to sintering caused by the exhaust gas containing a large amount of oxygen emitted during the fuel-supply cutoff period. If the single catalytic converter deteriorate due to deterioration of the catalysts, the exhaust gas cannot be purified.

The invention provides an exhaust system of an internal combustion engine, in which exhaust gas is appropriately purified even if a catalytic converter disposed downstream of a turbine deteriorates during a fuel-supply cutoff period.

SUMMARY OF THE INVENTION

In an exhaust system of an internal combustion engine having a plurality of cylinders according to one aspect of the invention, all of the cylinders are divided into two cylinder groups, and a first exhaust passage and a second exhaust passage are connected to respective exhaust manifolds of the two cylinder groups, such that the first exhaust passage communicates with the second exhaust passage via a first junction point provided in the first exhaust passage and a second junction point provided in the second exhaust passage. The exhaust system includes a turbine of a turbocharger and a first catalytic converter disposed downstream of the first junction point of the first exhaust passage, and a control valve disposed downstream of the second junction point of the second exhaust passage. The first catalytic converter is disposed downstream of the turbine. In the exhaust system, another control valve is disposed downstream of the first junction point of the first exhaust passage, and a second catalytic converter is disposed downstream of the second junction point of the second exhaust passage. The opening amounts of the control valves disposed in the first exhaust passage and the second exhaust passage are controlled so that exhaust gas of all of the cylinders mainly passes one of the first catalytic converter and the second catalytic converter during a fuel-supply cutoff period.

With the arrangement as described above, during the fuel-supply cutoff period, the exhaust gas of all of the cylinders mainly passes the first catalytic converter disposed in the first exhaust passage. Accordingly, if the temperature of the first catalytic converter is high, the first catalytic converter may deteriorate due to a large amount of oxygen contained in the exhaust gas. However, the second catalytic converter is disposed in the second exhaust passage. Therefore, during the fuel-supply cutoff period, almost no exhaust gas containing a large amount of oxygen passes the second catalytic converter. As a result, deterioration of the second catalytic converter is suppressed, and the exhaust gas can be purified by the second catalytic converter.

In the exhaust system described above, during the fuel-supply cutoff period, the temperatures of the first catalytic converter and the second catalytic converter may be measured or estimated. If the temperature of the second catalytic converter is lower than that of the first catalytic converter, the opening amounts of the control valves disposed in the first exhaust passage and the second exhaust passage may be controlled so that the exhaust gas of all of the cylinders mainly passes the second catalytic converter.

With the arrangement as described above, if the temperature of the first catalytic converter disposed in the first exhaust passage is high, the chance that the exhaust gas containing a large amount of oxygen passes the first catalytic converter during the fuel-supply cutoff period is reduced, which suppresses deterioration of the first catalytic converter. When the exhaust gas containing a large amount of oxygen passes the second catalytic converter disposed in the second exhaust passage during the fuel-supply cutoff period, the temperature of the second catalyst is unlikely to be high because the temperature of the second catalytic converter is lower than that of the first converter at this time. Accordingly, deterioration of the second catalytic converter is suppressed. As a result, the exhaust gas can be appropriately purified by using the two catalytic converters.

In the exhaust system as described above, during the fuel-supply cutoff period, the temperature of the second catalytic converter may be measured or estimated. If the temperature of the second catalytic converter is lower than a predetermined temperature, the opening amounts of the control valves disposed in the first exhaust passage and the second exhaust passage may be controlled so that the exhaust gas of all of the cylinders mainly passes the second catalytic converter.

With the arrangement as described above, if the temperature of the first catalytic converter disposed in the first exhaust passage is high, the chance that the exhaust gas containing a large amount of oxygen passes the first catalytic converter during the fuel-supply cutoff period is reduced, which suppresses deterioration of the first catalytic converter. When the exhaust gas containing a large amount of oxygen passes the second catalytic converter during the fuel-supply cutoff period, the temperature of the second catalyst is lower than the predetermined temperature. Accordingly, deterioration of the second catalytic converter is suppressed. As a result, the exhaust gas can be appropriately purified by using the two catalytic converters.

In the exhaust system as described above, the control valve disposed in the first exhaust passage may be controlled to be fully closed, and the control valve disposed in the second exhaust passage may be controlled to be fully opened.

An exhaust system of an internal combustion engine having a plurality of cylinders according to another aspect of the invention includes: a first cylinder group and a second cylinder group which constitute all of the cylinders of the engine, a first exhaust passage and a second exhaust passage that are connected to respective exhaust manifolds of the first cylinder group and the second cylinder group, the first exhaust passage and the second exhaust passage having respective junction points through which the first and second exhaust passages communicate with each other, a turbine of a turbocharger disposed downstream of the junction point of the first exhaust passage, a first catalytic converter disposed downstream of the turbine in the first exhaust passage, a first control valve disposed downstream of the junction point of the first exhaust passage, a second catalytic converter disposed downstream of the junction point of the second exhaust passage, a second control valve disposed downstream of the junction point of the second exhaust passage, and a controller that controls the opening amounts of the control valves disposed in the first exhaust passage and the second exhaust passage so that exhaust gas of all of the cylinders mainly passes one of the first catalytic converter and the second catalytic converter during a fuel-supply cutoff period.

In the exhaust system described above, during the fuel-supply cutoff period, the temperatures of the first catalytic converter and the second catalytic converter may be measured or estimated. If the temperature of the second catalytic converter is lower than that of the first catalytic converter, the controller may control the opening amounts of the control valves disposed in the first exhaust passage and the second exhaust passage so that the exhaust gas of all of the cylinders mainly passes the second catalytic converter.

In the exhaust system as described above, during the fuel-supply cutoff period, the temperature of the second catalytic converter may be measured or estimated. If the temperature of the second catalytic converter is lower than a predetermined temperature, the controller may control the opening amounts of the control valves disposed in the first exhaust passage and the second exhaust passage so that the exhaust gas of all of the cylinders mainly passes the second catalytic converter disposed in the second exhaust passage.

In the exhaust system as described above, the controller may perform control so that the control valve disposed in the first exhaust passage is fully closed, and the control valve disposed in the second exhaust passage is fully opened.

BRIEF DESCRIPTION OF THE DRAWINGS

The foregoing and/or further objects, features and advantages of the invention will become more apparent from the following description of preferred embodiments with reference to the accompanying drawings, wherein the same or corresponding portions will be denoted by the same reference numerals and wherein.

DETAILED DESCRIPTION OF THE EXAMPLE EMBODIMENT

In the following description, the present invention will be described in more detail in terms of example embodiment.

Figure 1:
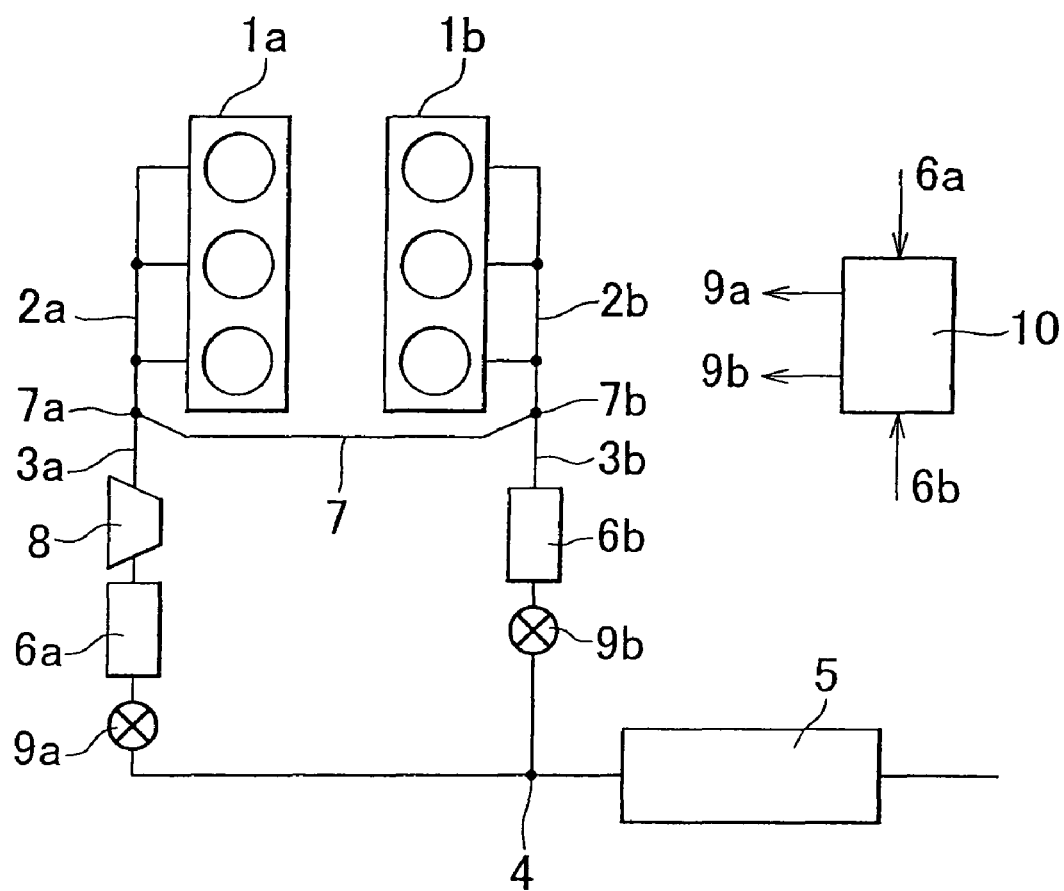
FIG. 1 is the schematic view showing an exhaust system of an internal combustion engine according to one embodiment of the invention.

FIG. 1 is the schematic view showing an exhaust system of an internal combustion engine according to one embodiment of the invention. In FIG. 1, the internal combustion engine in the form of a V-type engine includes a first bank 1a and a second bank 1b, and a first exhaust manifold 2a and a second exhaust manifold 2b are connected to the first bank 1a and the second bank 1b, respectively. A first exhaust passage 3a is connected to the first exhaust manifold 2a, and a second exhaust passage 3b is connected to the second exhaust manifold 2b. The first exhaust passage 3a and the second exhaust passage 3b join together at an exhaust merging point 4, and a main catalytic converter 5 is disposed downstream of the exhaust merging point 4.

The V-type engine mainly operates at the stoichiometric air/fuel ratio. A three-way catalytic converter is selected as the main catalytic converter 5. The main catalytic converter 5 is relatively large in size, but this does not cause a problem in terms of vehicle installation efficiency since the converter 5 is mounted under the floor of the vehicle. Thus, the main catalytic converter 5 favorably purifies a large amount of exhaust gas emitted from respective cylinders during high-load operation of the engine.

However, the exhaust gas emitted from the respective cylinders during low-load engine operation has a relatively low temperature, and its temperature is further reduced by the time the exhaust gas flows into the main catalytic converter 5. In this case, therefore, the main catalytic converter 5 cannot be kept at a catalyst activation temperature or its operating temperature, resulting in insufficient purification of the exhaust gas.

In the embodiment of the invention, a first auxiliary catalytic converter 6a acting as a three-way catalytic converter is mounted near the engine body in the first exhaust passage 3a, and a second auxiliary catalytic converter 6b is mounted near the engine body in the second exhaust passage 3b. With this arrangement, when low-load engine operations are performed in the first bank 1a and second bank 1b, the resulting exhaust gas having a relatively low temperature flows into the first auxiliary catalytic converter 6a and second auxiliary catalytic converter 6b which are located near the engine body, before the gas temperature is further reduced. As a result, catalysts carried on the respective catalytic converters 6a, 6b are kept at the activation temperature, and the exhaust gas produced at a low load can be sufficiently purified. Also, the first auxiliary catalytic converter 6a and second auxiliary catalytic converter 6b mounted near the engine body are promptly activated when the engine is started, and enabled to purify the exhaust gas immediately after the engine is started.

In the embodiment of the invention, the first exhaust passage 3a and the second exhaust passage 3b communicate with each other via a connecting pipe 7 that connects a junction point 7a of the passage 3a with a junction point 7b of the passage 3b. A turbine 8 of a turbocharger is disposed in the first exhaust passage 3a between the junction point 7a and the first auxiliary catalytic converter 6a. Also, a first control valve 9a is disposed in the first exhaust passage 3a downstream of the first auxiliary catalytic converter 6a. The first control valve 9a adjusts the amount of exhaust gas passing through the first exhaust passage 3a such that the lower limit of the exhaust gas amount is equal to zero, and may be disposed anywhere in the first exhaust passage 3a provided that it is located downstream of the junction point 7a.

A second control valve 9b is disposed in the second exhaust passage 3b downstream of the second auxiliary catalytic converter 6b. The second control valve 9b adjusts the amount of exhaust gas passing through the second exhaust passage 3b such that the lower limit of the exhaust gas amount is equal to zero, and may be disposed anywhere in the second exhaust passage 3b provided that it is located downstream of the junction point 7b. The opening amounts of the first control valve 9a and second control valve 9b are controlled by a controller 10 as shown in FIG. 1.

A compressor (not shown) of the turbocharger coupled to the turbine 8 is disposed upstream of a throttle valve of an engine intake system, and performs supercharging. By controlling the opening amounts of the first control valve 9a and second control valve 9b, the amount of exhaust gas passing the turbine 8 of the first exhaust passage 3a can be controlled as desired, namely, can be changed from a condition in which no exhaust gas passes the turbine 8 (which condition is established by fully closing the first control valve 9a and fully opening the second control valve 9b) to a condition in which exhaust gas of all of the cylinders passes the turbine 8 (which condition is established by fully opening the first control valve 9a and fully closing the second control valve 9b). In this manner, the boost pressure can be controlled depending upon the engine operating states by changing the amount of exhaust gas passing the turbine 8, even in the absence of a wastegate passage that is generally provided for bypassing the turbine 8.

When the vehicle is decelerating, a fuel-supply cutoff operation is usually performed to save fuel. During the fuel-supply cutoff period, air is emitted, as it is, from the respective cylinders as the exhaust gas, and, therefore, the exhaust gas contains a large amount of oxygen. The temperature of the main catalytic converter 5 does not become considerably high, because the main catalytic converter 5 is relatively distant from the engine body. However, the temperatures of the first auxiliary catalytic converter 6a and second auxiliary catalytic converter 6b may become considerably high (800° C. or higher), because the first auxiliary catalytic converter 6a and second auxiliary catalytic converter 6b are disposed near the engine body. If the exhaust gas containing a large amount of oxygen emitted during the fuel-supply cutoff period flows into the first auxiliary catalytic converter 6a or second auxiliary catalytic converter 6b, catalysts, formed of noble metal, usually carried on the catalytic converters, undergo sintering and, consequently, deteriorate. If both the first auxiliary catalytic converter 6a and second auxiliary catalytic converter 6b deteriorate due to such sintering, the exhaust gas cannot be appropriately purified when the engine load is low or when the engine is started.

Figure 2:
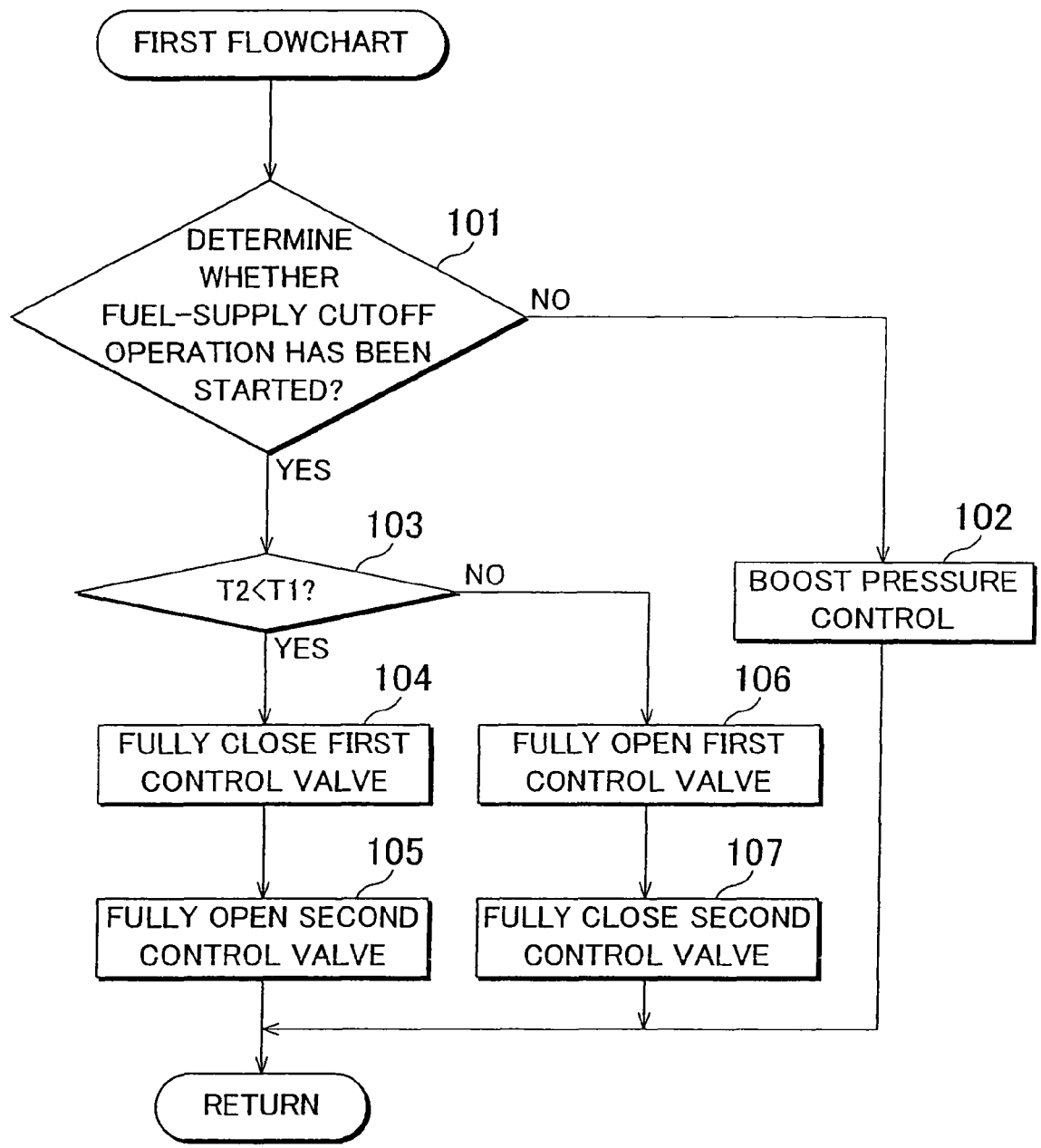
FIG. 2 is the first flowchart used for controlling a first control valve and a second control valve.

In the embodiment of the invention, the controller 10 controls the opening amounts of the first control valve 9a and the second control valve 9b according to the routine of the first flowchart shown in FIG. 2 to prevent deterioration of both the first auxiliary catalytic converter 6a and second auxiliary catalytic converter 6b. First, in step 101, it is determined whether the fuel-supply cutoff operation has been started. If a negative determination is made in step 101, in step 102, the controller 10 controls the opening amounts of the first control valve 9a and the second control valve 9b based on the amount of exhaust gas emitted from the respective cylinders in the current engine operating state. Thus, the amount of exhaust gas passing the turbine 8 disposed in the first exhaust passage 3a is controlled to achieve a desired boost pressure. If the amount of exhaust gas emitted from the respective cylinders does not change, the amount of exhaust gas passing the turbine 8 decreases with decreases in the opening amount of the first control valve 9a. In this case, the second control valve 9b may be controlled to be fully opened. On the other hand, the amount of exhaust gas passing the turbine 8 increases with decreases in the opening amount of the second control valve 9a. In this case, the first control valve 9a may be controlled to be fully opened.

If the fuel-supply cutoff operation has been started and, therefore, an affirmative determination is made in step 101, in step 103, the temperature T1 of the first auxiliary catalytic converter 6a and the temperature T2 of the second auxiliary catalytic converter 6b are measured or estimated, and it is determined whether the temperature T2 of the second auxiliary catalytic converter 6b is lower than the temperature T1 of the first auxiliary catalytic converter 6a. The temperatures T1 and T2 are estimated in consideration of the temperature of the exhaust gas based on the engine operation state immediately before the fuel-supply cutoff operation is started, the amounts of exhaust gases that have passed the first auxiliary catalytic converter 6a and the second auxiliary catalytic converter 6b, respectively, and the fact that the temperature of the exhaust gas that will flow into the first auxiliary catalytic converter 6a is decreased when the exhaust gas passes the turbine 8.

When an affirmative determination is made in step 103, namely, when the temperature T2 of the second auxiliary catalytic converter 6b is lower than the temperature T1 of the first auxiliary catalytic converter 6a, the first control valve 9a is fully closed in step 104, and the second control valve 9b is fully opened in step 105. Thus, the exhaust gas in the second bank 1b entirely flows through the second exhaust passage 3b and follows into the second auxiliary catalytic converter 6b. Also, the exhaust gas in the first bank 1a entirely flows through the connecting pipe 7 and the second exhaust passage 3b, and flows into the second auxiliary catalytic converter 6b. Thus, the exhaust gas of all the cylinders passes the second auxiliary catalytic converter 6b.

In the operating state immediately before the vehicle starts decelerating, namely, immediately before the fuel-supply cutoff operation is started, the engine load is usually high and, therefore, high boost pressure is required. At this time, the second control valve 9b is substantially closed, and a large amount of exhaust gas having a high temperature passes the turbine 8. Thus, the temperature of the first auxiliary catalytic converter 6a disposed downstream of the turbine 8 in the first exhaust passage 3a is usually considerably high. In contrast, the amount of exhaust gas which flows through the second exhaust passage 3b and passes the second auxiliary catalytic converter 6b is small, and the temperature of the second auxiliary catalytic converter 6b is usually relatively low. In such a case, if an affirmative determination is made in step 103 and, therefore, the exhaust gas of all the cylinders is caused to pass the second auxiliary catalytic converter 6b during the fuel-supply cutoff period, the exhaust gas containing a large amount of oxygen does not pass the first auxiliary catalytic converter 6a having a considerably high temperature. As a result, deterioration of the first auxiliary catalytic converter 6a is suppressed. Meanwhile, the exhaust gas containing a large amount of oxygen passes the second auxiliary catalytic converter 6b. However, there is almost no possibility that the second auxiliary catalytic converter 6b deteriorates because the temperature of the second auxiliary catalytic converter 6b is low.

When a negative determination is made in step 103, namely, when the temperature T2 of the second auxiliary catalytic converter 6b is equal to or higher than the temperature T1 of the first auxiliary catalytic converter 6a, the first control valve 9a is fully opened in step 106, and the second control valve 9b is fully closed in step 107. Thus, the exhaust gas in the first bank 1a entirely flows through the first exhaust passage 3a and flows into the first auxiliary catalytic converter 6a. Meanwhile, the exhaust gas in the second bank 1b entirely flows through the connecting pipe 7 and the first exhaust passage 3a, and flows into the first auxiliary catalytic converter 6a. Thus, the exhaust gas of all the cylinders passes the first auxiliary catalytic converter 6a.

When a negative determination is made in step 103, in the operating state immediately before the fuel-supply cutoff operation is started, a relatively large amount of exhaust gas passes the second exhaust passage 3b. At this time, the medium-low load engine operation, where the boost pressure need not be as high as that in the high-load engine operation, is performed, and the temperature of the exhaust gas is not as high as that when the engine load is high. Accordingly, the possibility that the temperature T1 of the first auxiliary catalytic converter 6a, which is equal to or lower than the temperature T2 of the second auxiliary catalytic converter 6b, is considerably high is low. Even if the exhaust gas of all the cylinders is caused to pass the first auxiliary catalytic converter 6a, the first auxiliary catalytic converter 6a is unlikely to deteriorate. Also, the second auxiliary catalytic converter 6b, which the exhaust gas does not pass, does not deteriorate. In this manner, deterioration of both the first auxiliary catalytic converter 6a and the second auxiliary catalytic converter 6b is suppressed, which prevents the situation where the exhaust gas cannot be purified when the engine load is low and the engine is started.

Figure 3:
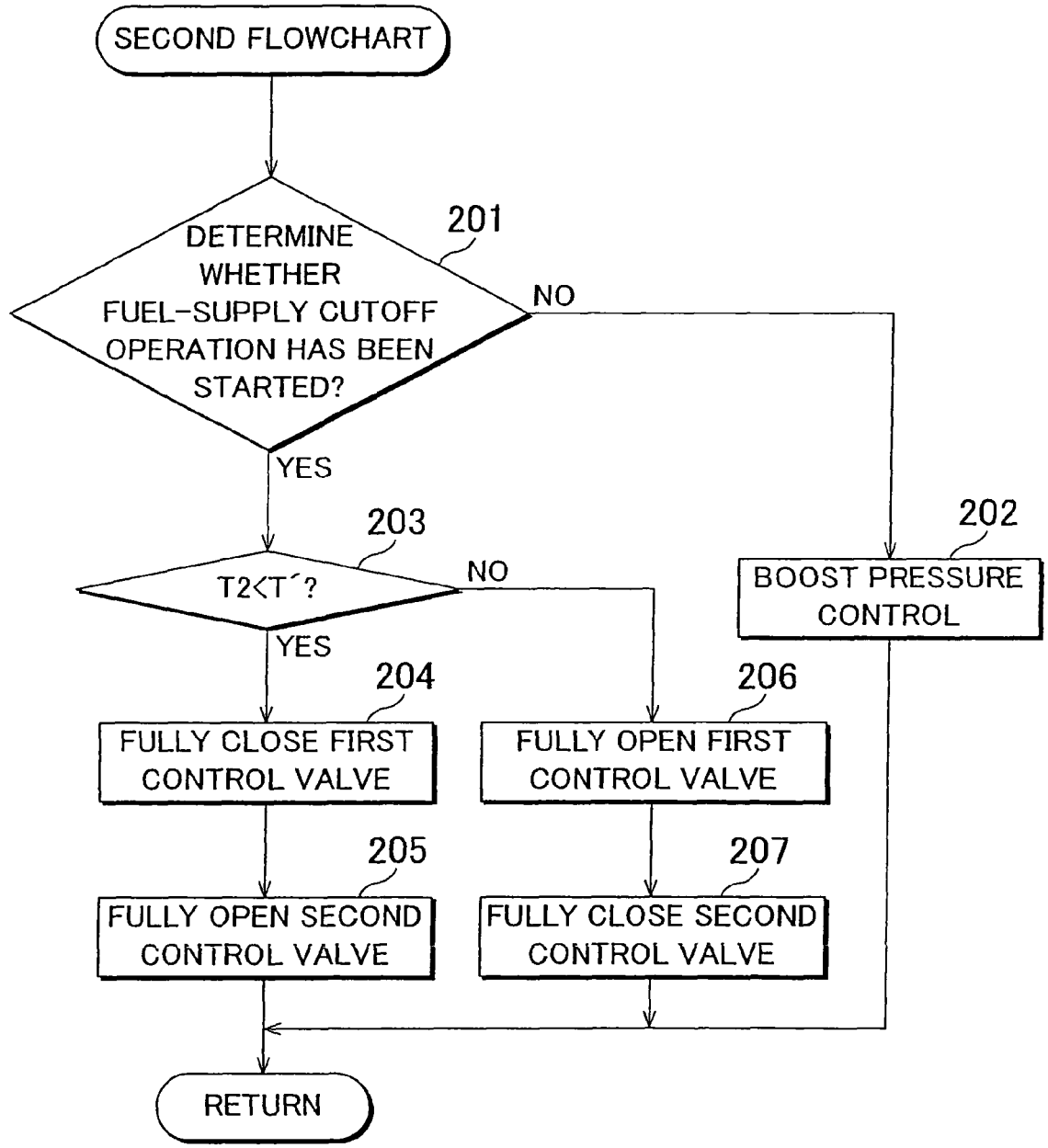
FIG. 3 is a second flowchart used for controlling the first control valve and the second control valve.

FIG. 3 shows the second flowchart including the routine for controlling the opening amounts of the first control valve 9a and the second control valve 9b to prevent deterioration of both the first auxiliary catalytic converter 6a and the second auxiliary catalytic converter 6b. The routine shown in the second flowchart is the same as the routine shown in the first flowchart except the following points. In the routine shown in the second flowchart, in step 203, only the temperature T2 of the second auxiliary catalytic converter 6b is measured or estimated, and it is determined whether the temperature T2 is lower than a predetermined temperature T' at which sintering of the catalysts formed of noble metal is not caused even if the air passes the second auxiliary catalytic converter 6b. Only when an affirmative determination is made in step 203, the controller 10 controls the opening amounts of the control valves 9a and 9b so that the first control valve 9a is fully closed in step 204, and the second control valve 9b is fully opened in step 205. As a result, the exhaust gas of all the cylinders passes the second auxiliary catalytic converter 9b.

According to the routine, deterioration of the second auxiliary catalytic converter 9b is suppressed. Also, because the exhaust gas of all the cylinders passes the second auxiliary catalytic converter 9b during the fuel-supply cutoff period, deterioration of the first auxiliary catalytic converter 6a is not caused. If both the temperature T1 of the first auxiliary catalytic converter 6a and the temperature T2 of the second auxiliary catalytic converter 6b exceed the predetermined temperature T' in the engine operating state immediately before the fuel-supply cutoff operation is started, there is a possibility that the first auxiliary catalytic converter 6a deteriorates. However, the possibility is low. In this manner, deterioration of both the first auxiliary catalytic converter 6a and the second auxiliary catalytic converter 6b is suppressed, which prevents the situation where the exhaust gas cannot be purified when the engine load is low and the engine is started.

In the routines shown in the first flowchart and the second flowchart, one of the first control valve 9a and the second control valve 9b is fully closed during the fuel-supply cutoff period. However, the control is not limited to this. The first control valve 6a or the second control valve 6b may be slightly opened so that a small amount of exhaust gas passes one of the first auxiliary catalytic converter 6a and the second auxiliary catalytic converter 6b. The opening amounts of the first control valve 9a and the second control valve 9b are controlled so that the exhaust gas of all the cylinders mainly passes the other of the first auxiliary catalytic converter 6a and the second auxiliary catalytic converter 6b.

In the routines shown in the first flowchart and the second flowchart, the temperature of the second auxiliary catalytic converter 6b is measured or estimated when the fuel-supply cutoff operation is started. However, the control is not limited to this. For example, when the fuel-supply cutoff operation is started, both the opening amounts of the first control valve 9a and the second control valve 9b may be controlled so that the first control valve 9a is fully opened and the second control valve 9b is fully closed without measuring or estimating the temperature of the catalytic converter. With the arrangement as described above, the exhaust gas containing a large amount of oxygen entirely passes the first auxiliary catalytic converter 6a during the fuel-supply cutoff period. If the temperature of the first catalytic converter 6a is considerably high, the first catalytic converter 6a may deteriorate. However, the second catalytic converter 6b does not deteriorate at all. Accordingly, the exhaust gas can be purified by using at least the second auxiliary catalytic converter 6b when the engine load is low and the engine is started.

While the main catalytic converter 5 is in the form of a three-way catalytic converter in the illustrated embodiment, it may be in the form of a NOx catalytic converter in the case where the internal combustion engine is capable of lean-burn operation. In the case where a NOx catalytic converter is used, if the engine operates at a stoichiometric air/fuel ratio or a rich air/fuel ratio at an extremely high load, for example, the main catalytic converter 5 is preferably a combination of a three-way catalytic converter and a NOx catalytic converter that are arranged in series.

While the internal combustion engine is a V-type engine in the illustrated embodiment, the invention is not limitedly applied to this type of engine, but may be applied to any type of engine provided that the engine has a plurality of cylinders that can be divided into two groups, each of which is provided with an exhaust manifold. The plurality of cylinders may be arranged in series. The invention may also be applied to engines having three or more groups of cylinders. In this case, three or more exhaust passages upstream of the exhaust merging point are roughly divided into two groups, so that the invention can be applied to this type of engine.

While the invention has been described with reference to example embodiment thereof, it should be understood that the invention is not limited to the example embodiment or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

The invention claimed is:

1. An exhaust system of an internal combustion engine having a plurality of cylinders, comprising:
a first cylinder group and a second cylinder group which constitute all of the cylinders of the engine;
a first exhaust passage and a second exhaust passage that are connected to respective exhaust manifolds of the first cylinder group and the second cylinder group, the first exhaust passage and the second exhaust passage having respective junction points through which the first and second exhaust passages communicate with each other;
a turbine of a turbocharger disposed downstream of the junction point of the first exhaust passage;
a first catalytic converter disposed downstream of the turbine in the first exhaust passage;
a first control valve disposed downstream of the junction point of the first exhaust passage;
a second catalytic converter disposed downstream of the junction point of the second exhaust passage;
a second control valve disposed downstream of the junction point of the second exhaust passage; and
a controller that controls opening amounts of the control valves disposed in the first exhaust passage and the second exhaust passage so that exhaust gas of all of the cylinders mainly passes one of the first catalytic converter and the second catalytic converter during a fuel-supply cutoff period, wherein
during the fuel-supply cutoff period, temperatures of the first catalytic converter and the second catalytic converter are measured or estimated, and if the temperature of the second catalytic converter is lower than the temperature of the first catalytic converter, the controller controls the opening amounts of the control valves disposed in the first exhaust passage and the second exhaust passage so that the exhaust gas of all of the cylinders mainly passes the second catalytic converter.

2. The exhaust system of an internal combustion engine according to claim 1, wherein
the controller performs control so that the control valve disposed in the first exhaust passage is fully closed, and the control valve disposed in the second exhaust passage is fully opened.

3. The exhaust system of an internal combustion engine according to claim 1, wherein the first catalytic converter and the second catalytic converter have the same characteristics.

4. The exhaust system of an internal combustion engine according to claim 1, wherein the second control valve and the second catalytic converter are connected in series.

5. An exhaust system of an internal combustion engine having a plurality of cylinders, comprising:
a first cylinder group and a second cylinder group which constitute all of the cylinders of the engine;
a first exhaust passage and a second exhaust passage that are connected to respective exhaust manifolds of the first cylinder group and the second cylinder group, the first exhaust passage and the second exhaust passage having respective junction points through which the first and second exhaust passages communicate with each other;
a turbine of a turbocharger disposed downstream of the junction point of the first exhaust passage;
a first catalytic converter disposed downstream of the turbine in the first exhaust passage;
a first control valve disposed downstream of the junction point of the first exhaust passage;
a second catalytic converter disposed downstream of the junction point of the second exhaust passage;
a second control valve disposed downstream of the junction point of the second exhaust passage; and
a controller that controls opening amounts of the control valves disposed in the first exhaust passage and the second exhaust passage so that exhaust gas of all of the cylinders mainly passes one of the first catalytic converter and the second catalytic converter during a fuel-supply cutoff period, wherein
during the fuel-supply cutoff period, a temperature of the second catalytic converter is measured or estimated, and if the temperature of the second catalytic converter is lower than a predetermined temperature, the controller controls the opening amounts of the control valves disposed in the first exhaust passage and the second exhaust passage so that the exhaust gas of all of the cylinders mainly passes the second catalytic converter disposed in the second exhaust passage.

6. The exhaust system of an internal combustion engine according to claim 5, wherein
the controller performs control so that the control valve disposed in the first exhaust passage is fully closed, and the control valve disposed in the second exhaust passage is fully opened.

7. The exhaust system of an internal combustion engine according to claim 5, wherein the first catalytic converter and the second catalytic converter have the same characteristics.

8. The exhaust system of an internal combustion engine according to claim 5, wherein the second control valve and the second catalytic converter are connected in series.

* * * * *